United States Patent [19]

Diener

[11] Patent Number: 4,520,595

[45] Date of Patent: Jun. 4, 1985

[54] AUTOMATIC MACHINE TOOL

[75] Inventor: Herbert Diener, Albstadt, Fed. Rep. of Germany

[73] Assignee: Gottlieb Guhring, Ebingen, Fed. Rep. of Germany

[21] Appl. No.: 521,018

[22] Filed: Aug. 8, 1983

Related U.S. Application Data

[63] Continuation of Ser. No. 280,832, Jul. 6, 1981, abandoned.

[30] Foreign Application Priority Data

Jul. 7, 1980 [DE] Fed. Rep. of Germany ....... 3025638

[51] Int. Cl.³ .................. B24B 7/00; B23B 21/24
[52] U.S. Cl. .................................... 51/3; 29/38 C; 29/563; 51/240 T; 51/257 T; 74/816; 408/71
[58] Field of Search .............. 51/3, 52 R, 181, 240 R, 51/240 T, 108 R, 237 T; 409/80, 198; 74/813 R, 813 C, 816, 818, 826

[56] References Cited

U.S. PATENT DOCUMENTS

| | | | |
|---|---|---|---|
| 2,962,147 | 11/1960 | Klyce | 74/816 |
| 3,170,375 | 2/1965 | Weidaver | 409/198 |
| 3,318,195 | 5/1967 | Fitzner | 409/80 |
| 3,473,098 | 10/1969 | Waller | 409/80 |
| 3,518,899 | 7/1970 | Greenberg et al. | 74/816 |
| 3,589,078 | 6/1971 | Bala et al. | 51/240 X |
| 3,609,497 | 9/1971 | Kumagi et al. | 409/80 |
| 3,760,472 | 9/1973 | Kielma et al. | 409/80 |
| 4,103,569 | 8/1978 | Thomas | 74/816 |
| 4,163,313 | 8/1979 | Matsuno et al. | 409/80 |
| 4,168,639 | 9/1979 | Ingham et al. | 74/826 |
| 4,285,259 | 8/1981 | Jelinek et al. | 74/813 R |
| 4,301,581 | 11/1981 | Baden et al. | 29/38 C |

FOREIGN PATENT DOCUMENTS 2907664 9/1979 Fed. Rep. of Germany .......... 29/38

Primary Examiner—E. R. Kazenske
Assistant Examiner—Willmon Fridie, Jr.
Attorney, Agent, or Firm—Anthony H. Handal

[57] ABSTRACT

The invention relates to an automatic machine tool for machining workpieces, including a number n of workpiece receivers that can be adjusted in angular and/or spatial position and including an equal number n of work stations, one of said work stations being an exchange station, said receivers or stations being disposed at mutual angular separations of 360°/n on a rotatable index table, said stations or said receivers being locally fixed thereon and said index table being advanceable in such a manner that each workpiece traverses all stations in the same sequence. By applying the invention reliable and precise machining, coupled with simple construction should be achieved. This is made possible by the fact that the drive of the index table is controllable so that a sequence of (n−1) rotary steps by 360°/n in one direction is followed by a rotary step of 360° (n−1)/n in the opposite direction.

24 Claims, 3 Drawing Figures

AUTOMATIC MACHINE TOOL

This application is a continuation of application Ser. No. 280,832, filed July 6, 1981 now abandoned.

The invention relates to an automatic machine tool for machining workpieces.

In an automatic machine tool of this type described in the journal VDI-Zeitschrift, vol. 87, No 31/32, pages 489 ff, a horizontal index table supports seven radially oriented spindles serving as tool holders, each driven by a motor. These motors are supplied with current via slip rings disposed on the axis of rotation of the index table. This embodiment has the disadvantage that spark erosion, dirt particles, etc. may cause faulty contact at the slip rings. This disadvantage is especially serious if the motors being used are stepping motors serving to cause step-wise rotation or displacement of the spindles, for, in that case, even the drop-out of a single current pulse can cause errors. The occurrence of such spark erosion, or a similar fault leading to the interruption of contact, is especially likely because current flows at the same point on the slip rings in each of the working positions of the index table.

DE Offenlegungsschrift 28 48 668 makes known an automatic machine tool in which an index table is provided with tool receiver spindles that are coupled to locally stationary motors in the base via a transmission that may rotate around the axis of the index table. While the danger of loss of contact at the slip rings, discussed above, is not present in this machine tool, there is required a substantial mechanical effort and expense. Furthermore, precise spindle rotations or displacements necessitate a correspondingly precise transmission. Different transmissions must also be used depending on the speed and power required for different applications. If, in addition, the spindles must be displaced axially, the expense is even greater and may cause difficulties in the physical placement.

It is an object of the present invention to provide an automatic machine tool which, when in use, is reliable and provides precise machining, coupled with simple construction.

Thus, in the machine tool according to one embodiment of the invention, the index table is stepped forward, from a starting position, by single rotary steps of 360°/n, corresponding to the division of the index table into receiver and processing stations, (n−1) times, in the same direction, to a terminal position from which it is returned to its starting position in a single step in the opposite direction. Accordingly, the receiver mechanisms or processing stations located on the index table execute less than one full rotation for each cycle, making it possible to provide for fixed connections between the drive means for rotation and/or displacement of the receiver and processing stations and associated power supplies. The drive means may be electric motors, hydraulic actuators or pneumatic actuators. In all cases, the fixed connection guarantees precise rotation or displacement of the receiver or processing station. The fixed connection may be embodied in very simple fashion and makes possible construction or re-fitting of the receivers and work stations to prevailing requirements without special additional steps.

An advantageous embodiment of the invention is that the receivers or work stations located on the index table are supplied with power via flexible supply lines that may be wound around the rotational shaft of the index table. If the length of this spiral is chosen properly, the supply lines are subjected to minimum mechanical stress which represents a great advantage with respect to operational reliability and expense. Advantageously, the supply cables are fed through a cable guide which is coaxial with the index table shaft. It is further advantageous to associate the supply lines with feedback signal lines that transmit electrical, hydraulic or pneumatic signals from rotational or positional detectors at the receivers or work stations, making possible the detection of the prevailing status without any interruption of the connection and without danger of a resulting imprecision. By disposing the supply lines around the index table shaft in helical form, they are stressed substantially only longitudinally, which decreases the expense and increases operational reliability.

In one embodiment of the invention the index table is of the revolver type, in which the axes of the receiver or work stations are parallel to the index table axis. This embodiment is especially favorable if the receivers or work stations must all perform an axial movement during the cycle, which may be accomplished by a displacement of the index table.

The invention will be described in greater detail with the aid of an exemplary embodiment and with reference to the drawing.

Figure 1:
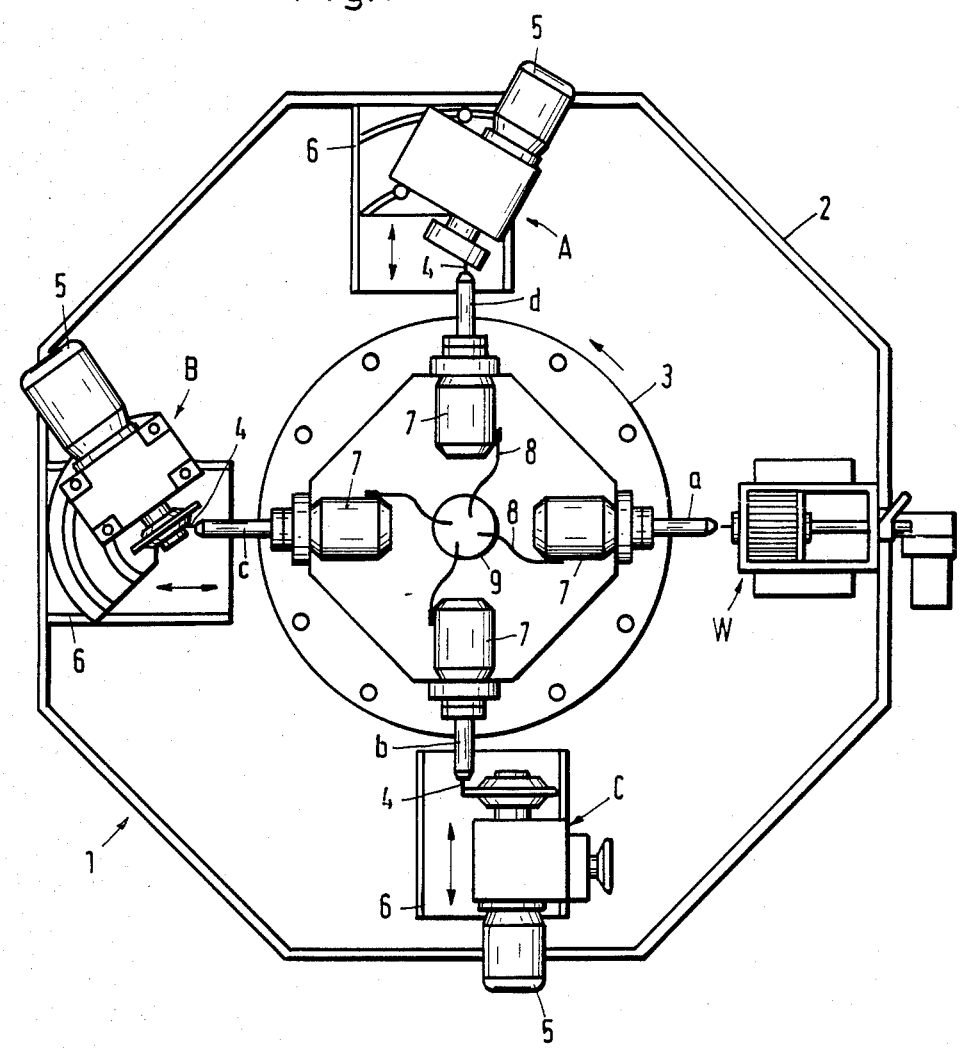
FIG. 1 is a schematic plan view of an exemplary embodiment of the machine tool.

FIG. 1 illustrates an exemplary embodiment in which the machine tool 1 is intended for the production of drill bits, milling machine cutters, reamers or the like. This machine has an annular base table 2 on which are disposed an exchange station W and work stations A, B and C, at equal angular distances of 90°. An index table 3, which accommodates workpiece receiver spindles a, b, c, and d for holding workpieces 4, is coaxially rotatable with respect to the index table 3. The work stations A, B and C contain appropriate tools, such as grinding wheels or the like, which are driven by tool drive motors 5 and may be displaced and moved to the appropriate working positions with the aid of feed mechanisms 6. In the illustrated embodiment, the station A is a point grinding station, station B is a groove grinding stations and station C is a relief grinding station. The exchange station W is equipped with a mechanism for removing a finished piece 4 from the respective spindle and to replace it with a blank, as well as with a magazine for blanks and a receiver for finished workpieces.

The rotational or spatial position of the spindles a–d may be adjusted by respective motors 7. For precise positioning, the motors 7 are stepping motors or DC motors with feedback, permitting an exact adjustment of position. Each motor 7 is connected by a supply line 8 to a source, not shown, which delivers drive power, positioning signals or the like. The various supply lines are inserted, near the axis of the index table 3, into a cable conduit 9 which is concentric with the index table 3 and which is either stationary or rotatable relative thereto. In the latter case, care should be taken that no deleterious friction occurs between the upper edge of the conduit 9 and the supply lines 8. Within the conduit 9, the supply lines are guided loosely to near the bottom of the base 2 whence they are brought to the supply sources, not shown. It is particularly advantageous to wind the supply lines 8 helically within the conduit 9 so that the motions of the index table 3 cause only slight longitudinal tensile or compressive stresses to be applied to them.

Figure 2:
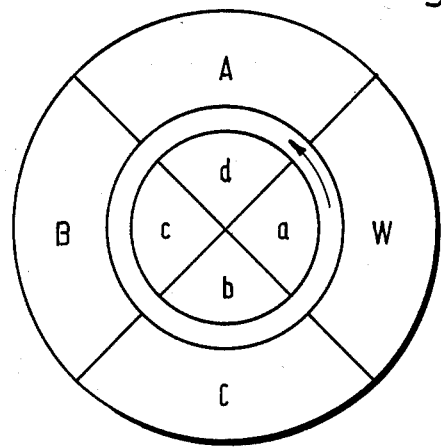
FIGS. 2 and 3 show schematic dispositions of workpiece receivers and work stations of the machine tool.

FIG. 2 shows how the exchange station W, the machining stations A, B and C and the workpiece receiver spindles a to d of the machine tool according to FIG. 1 are arranged. The operational cycle of the machine is as follows: In the configuration of the index table 3 shown in FIGS. 1 and 2, a workpiece is being exchanged at the exchange station W on spindle a, while the workpieces on spindles d, c and b are being machined at machining stations A, B and C, respectively. At the completion of the ongoing processes, the index table is pivoted counterclockwise, as seen from the top, by 90°. As a consequence, the workpiece on spindle b can be exchanged at the exchange station W while the workpieces on spindles a, d and c are processed at the machining stations. Following this cycle is a further advance of the index table 3 by 90°, followed by yet another work cycle, another advance by 90° and a third work cycle, whereafter the index table 3 is pivoted in the opposite direction, i.e. clockwise, by 270°, thereby restoring it to its original position shown in FIGS. 1 and 2. The individual cycles are elucidated in Table 1 in which sequential workpieces are labeled 1 to 8 and their status of completion is indicated by appended letters A, AB or ABC. The association of stations and receivers or spindles is indicated for each case by composite reference characters.

Figure 3:
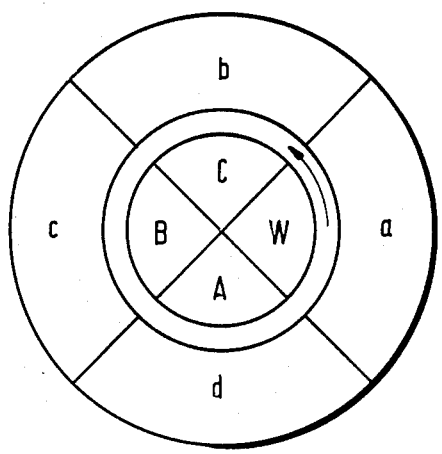

Of course, this principle of operation can also be reversed, as shown schematically in FIG. 3 illustrating one starting position and by Table 2 which lists the association of receivers and stations. Here too, the workpieces are numbered from 1 to 8 and their current finishing status is indicated by appended station letters. In this version, the stations are arranged on the index table with which they are rotated clockwise in three steps of 90°, whereafter they rotate counter-clockwise in a single step of 270°. The operational speed of the aforedescribed machine tool is nearly the same as that of heretofore known automatic machine tools in which the index table is advanced continually in one direction. The only difference is that the return motion, namely the pivoting by 360°(n−1)/n, i.e., by 270° in the exemplary embodiment, in the opposite direction, takes a little longer than the next forward step of 360°/n necessary for a heretofore known machine, i.e., by 90° for the example discussed. This very small delay, negligible relative to the time taken up by the machining steps, is more than fully compensated by the advantages of reliability and simple construction that are afforded by the automatic machine tool described hereinabove.

TABLE 1

| Wa | Ad | Bc | Cb |
|---|---|---|---|
| 1 | — | — | — |
| 1st ADVANCE | | | |
| Wb | Aa | Bd | Cc |
| 2 | 1A | — | — |
| 2d ADVANCE | | | |
| Wc | Ab | Ba | Cd |
| 3 | 2A | 1AB | — |
| 3rd ADVANCE | | | |
| Wd | Ac | Bb | Ca |
| 4 | 3A | 2AB | 1ABC |
| REVERSAL | | | |
| Wa | Ad | Bc | Cb |
| 1/5 | 4A | 3AB | 2ABC |
| 1st ADVANCE | | | |
| Wb | Aa | Bd | Cc |
| 2/6 | 5A | 4AB | 3ABC |

TABLE 1-continued

| 2d ADVANCE | | | |
|---|---|---|---|
| Wc | Ab | Ba | Cd |
| 3/7 | 6A | 5AB | 4ABC |
| 3rd ADVANCE | | | |
| Wd | Ac | Bb | Ca |
| 4/8 | 7A | 6AB | 5ABC |
| REVERSAL | | | |
| Wa | Ad | Bc | Cb |
| | | etc. | |

TABLE 2

| aW | bC | cB | dA |
|---|---|---|---|
| 1 | — | — | — |
| 1st ADVANCE | | | |
| aA | bW | cC | dB |
| 1A | 2 | — | — |
| 2d ADVANCE | | | |
| aB | bA | cW | dC |
| 1AB | 2A | 3 | — |
| 3rd ADVANCE | | | |
| aC | bB | cA | dW |
| 1ABC | 2AB | 3A | 4 |
| REVERSAL | | | |
| aW | bB | cB | dA |
| 1/5 | 2AB | 3A | 4 |
| 1st ADVANCE | | | |
| aA | bW | cC | dB |
| 5A | 2/6 | 3ABC | 4AB |
| 2d ADVANCE | | | |
| aB | bA | cW | dC |
| 5AB | 6A | 3/7 | 4ABC |
| 3rd ADVANCE | | | |
| aC | bB | cA | dW |
| 5ABC | 6AB | 7A | 4/8 |
| REVERSAL | | | |
| aW | bC | cB | dA |
| | | etc. | |

Various modifications in structure and/or function may be made by one skilled in the art to the disclosed embodiments without departing from the scope of the invention as defined by the claims.

What is claimed is:

1. A method for operating an automatic machine tool for machining workpieces having a plurality n of workpiece receivers where "n" is at least two or greater and an equal plurality n of work stations, the receivers or the stations being disposed at mutual angular separations of 360°/n on a rotatable index table comprising the steps of:
   driving the index table from a starting position in a sequence of (n−1) rotary steps of 360°/n in one direction such that each workpiece traverses the stations in the same sequence and
   driving the index table in a single rotary step of 360°(n−1)/n in the opposite direction to return the index table to the starting position.

2. The method according to claim 1 wherein each step of the sequence of (n−1) rotary steps is a single step.

3. A method according to claim 1 including the step of providing power to the workpiece receivers or the work stations via supply lines located below or above the index table, the supply lines being wound around an axis of the index table as the table is rotated.

4. A method according to claim 2 including the step of providing power to the workpiece receivers or the work stations via supply lines located below or above the index table, the supply lines being wound around an axis of the index table as the table is rotated.

5. A method according to claim 3 including the step of disposing the supply lines in a cable conduit which is coaxial with respect to the axis of the index table.

6. A method according to claim 3 wherein as the index table rotates the supply lines are wound helically around the axis of the index table.

7. A method according to claim 5 wherein as the index table rotates the supply lines are wound helically around the axis of the index table.

8. A method according to claim 1 including the step of transmitting feedback signals from the respective workpiece receivers or work stations to indicate the rotational and/or position of the receivers and/or the stations.

9. A method according to claim 2 including the step of transmitting feedback signals from the respective workpiece receivers or work stations to indicate the rotational and/or position of the receivers and/or the stations.

10. A method according to claim 3 including the step of transmitting feedback signals from the respective workpiece receivers or work stations to indicate the rotational and/or position of the receivers and/or the stations.

11. A method according to claim 6 including the step of transmitting feedback signals from the respective workpiece receivers or work stations to indicate the rotational and/or position of the receivers and/or the stations.

12. A method according to claim 1 including the step of providing power to the workpiece receivers or the work stations via supply lines disposed in a cable conduit which is coaxial with respect to an axis of the index table.

13. A method according to claim 1 including the step of providing power to the workpiece receivers or the work stations via supply lines which are wound helically around an axis of the index table.

14. A method according to claim 2 including the step of providing power to the workpiece receivers or the work stations via supply lines disposed in a cable conduit which is coaxial with respect to an axis of the index table.

15. A method according to claim 2 including the step of providing power to the workpiece receivers or the work stations via supply lines which are wound helically around an axis of the index table.

16. An automatic machine tool for machining workpieces comprising:
a plurality n of workpiece receiving means that can be adjusted in angular and/or spatial position where "n" is at two or greater;
an equal plurality n of work station means;
the receiving means or the station means being disposed at mutual angular separations of 360°/n on a rotatable index table means, the station means or the receiving means being locally fixed thereon and the index table means being advancable in such a manner that each workpiece traverses all stations in the same sequence;
and means for driving the index table means from a starting position in a sequence of (n−1) rotary steps of 360°/n in one direction followed by a single rotary step of 360°(n−1)/n in the opposite direction to return the index table means to the starting position.

17. A machine according to claim 16 wherein the receiving means or the station means disposed on the index table means is provided power via supply line means located below or above the index table means, the supply line means capable of being wound around an axis of the index table means as the table is rotated.

18. A machine according to claim 17 wherein the supply line means are current-carrying cables disposed in a cable conduit which is coaxial with respect to the axis of the index table means.

19. A machine according to claim 17 wherein the supply line means include feedback means for transmitting signals from rotational and/or positional detectors associated with respective receiving means or station means.

20. A machine according to claim 18 wherein the supply line means include feedback means for transmitting signals from rotational and/or positional detectors associated with respective receiving means or station means.

21. A machine according to claim 17 wherein the supply line means are wound helically around the axis of the index table means.

22. A machine according to claim 18 wherein the supply line means are wound helically around the axis of the index table means.

23. A machine according to claim 19 wherein the supply line means are wound helically around the axis of the index table means.

24. A machine according to claim 20 wherein the supply line means are wound helically around the axis of the index table means.

* * * * *